United States Patent
Li et al.

(10) Patent No.: US 11,080,379 B2
(45) Date of Patent: Aug. 3, 2021

(54) USER AUTHENTICATION

(71) Applicant: INTERNATIONAL BUSINESS MACHINES CORPORATION, Armonk, NY (US)

(72) Inventors: Wei Li, Beijing (CN); Yi Jie Ma, Beijing (CN); Zhi Dan Hao, Beijing (CN); Yu Mei Dai, Beijing (CN); Mai Zeng, Beijing (CN); Xue Yong Zhang, Beijing (CN); Wen Zhong Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 16/274,335

(22) Filed: Feb. 13, 2019

(65) Prior Publication Data
US 2020/0257785 A1    Aug. 13, 2020

(51) Int. Cl.
| | |
|---|---|
| *G06F 21/32* | (2013.01) |
| *G06F 21/62* | (2013.01) |
| *H04L 9/32* | (2006.01) |
| *H04L 29/06* | (2006.01) |

(52) U.S. Cl.
CPC .............. *G06F 21/32* (2013.01); *G06F 21/62* (2013.01); *H04L 9/3231* (2013.01); *H04L 63/0861* (2013.01)

(58) Field of Classification Search
CPC ..... G06F 21/32; G06F 21/62; H04L 63/0861; H04L 9/3231; H04L 9/32; H04L 29/06
See application file for complete search history.

(56) References Cited

U.S. PATENT DOCUMENTS

| | | | | |
|---|---|---|---|---|
| 7,593,000 | B1 | 9/2009 | Chin | |
| 9,026,927 | B2* | 5/2015 | Brumback | A61B 5/0002 715/764 |
| 9,256,720 | B2* | 2/2016 | Berini | G06F 21/32 |
| 2004/0064453 | A1* | 4/2004 | Ruiz | G06F 21/32 |
| 2008/0270161 | A1* | 10/2008 | Cohen | G11B 27/34 705/54 |

(Continued)

FOREIGN PATENT DOCUMENTS

| | | |
|---|---|---|
| CN | 104751171 A | 7/2015 |
| CN | 107832752 A | 3/2018 |
| WO | 2015005959 A1 | 1/2015 |

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Jayesh M Jhaveri
(74) *Attorney, Agent, or Firm* — Teddi E. Maranzano

(57) ABSTRACT

A method, system and computer program product for processing data are provided. In the method, a request is received to perform an access-controlled operation in a user device. A biometric feature input from an input module of the user device is received for the request. It is determined whether the received biometric feature matching with a primary biometric feature, the primary biometric feature being identified from a plurality of biometric features stored in the user device and being used to authenticate a user for the access-controlled operation. The access-controlled operation is enabled in response to determining the received biometric feature matching with a primary biometric feature.

20 Claims, 7 Drawing Sheets

(56) References Cited

U.S. PATENT DOCUMENTS

| | | | |
|---|---|---|---|
| 2010/0332392 A1* | 12/2010 | Ueno | G06Q 20/40145 |
| | | | 705/44 |
| 2014/0283142 A1 | 9/2014 | Shepherd et al. | |
| 2015/0242605 A1 | 8/2015 | Du et al. | |
| 2015/0358316 A1* | 12/2015 | Cronin | H04L 63/104 |
| | | | 726/6 |
| 2015/0363986 A1* | 12/2015 | Hoyos | G07C 9/00563 |
| | | | 340/5.61 |
| 2016/0057623 A1 | 2/2016 | Dutt et al. | |
| 2017/0109564 A1 | 4/2017 | Seo et al. | |

* cited by examiner

USER AUTHENTICATION

BACKGROUND

The present invention relates to user authentication, and more specifically, to a computer-implemented method, system and computer program product for authenticating a user for an access-controlled operation.

Mobile devices such as smart phones and tablets are rapidly becoming our digital identity. Users enjoy using them to facilitate their daily life more than ever before, consequently they store more and more sensitive and private information on their mobile devices. To protect the sensitive and private information on the mobile devices, some traditional authentication mechanisms such as PIN, pattern and password as well as biometric based mechanisms such as fingerprint, face and voice recognition have been used on the mobile devices.

SUMMARY

According to one embodiment of the present invention, there is provided a computer-implemented method. In the method, a request is received to perform an access-controlled operation in a user device. A biometric feature input from an input module of the user device is received for the request. It is determined whether the received biometric feature matching with a primary biometric feature, the primary biometric feature being identified from a plurality of biometric features stored in the user device, and being used to authenticate a user for the access-controlled operation. The access-controlled operation is enabled in response to determining the received biometric feature matching with a primary biometric feature.

Other embodiments and aspects, including but not limited to, computer systems and computer program products, are described in detail herein and are considered a part of the claimed invention.

These and other features and advantages of the present invention will be described, or will become apparent to those of ordinary skill in the art in view of, the following detailed description of the example embodiments of the present invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
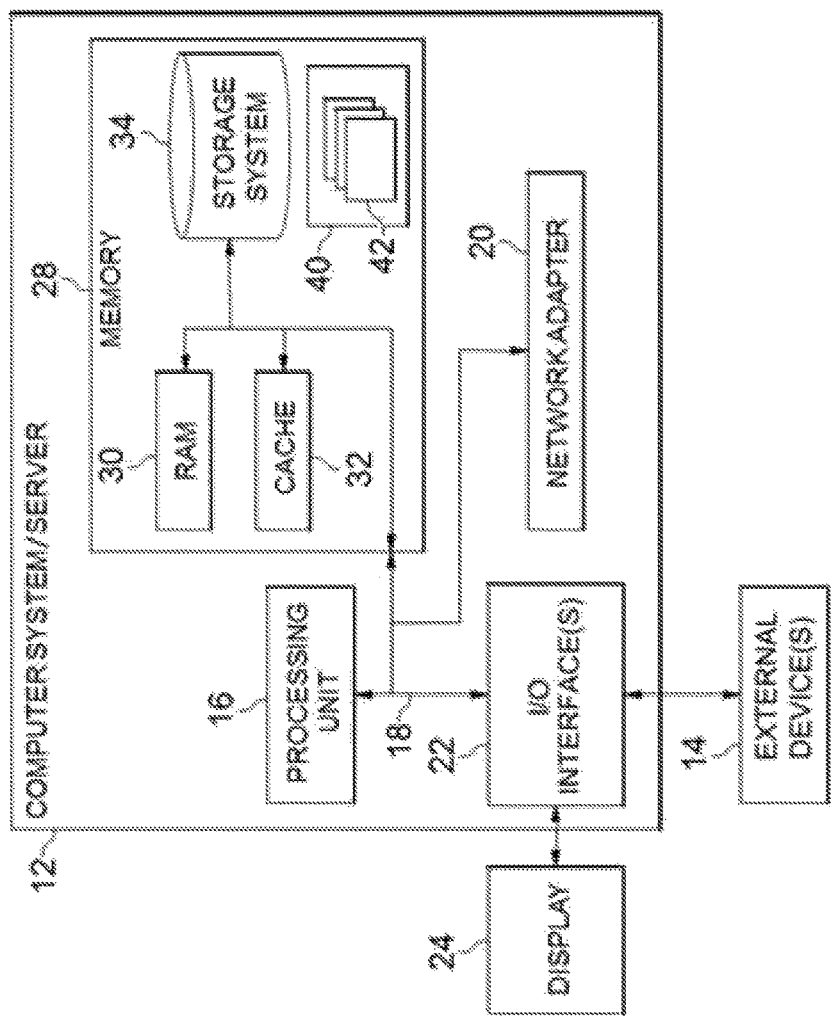
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
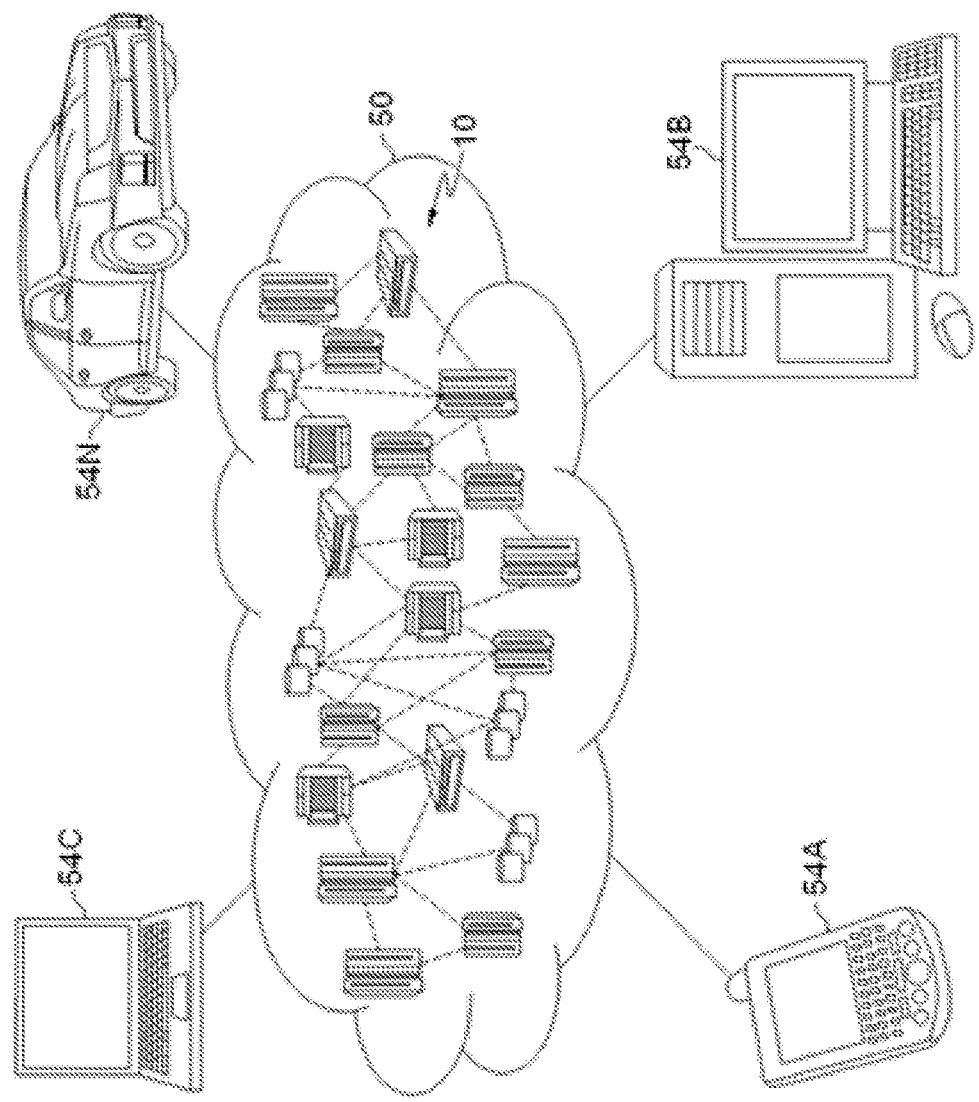
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
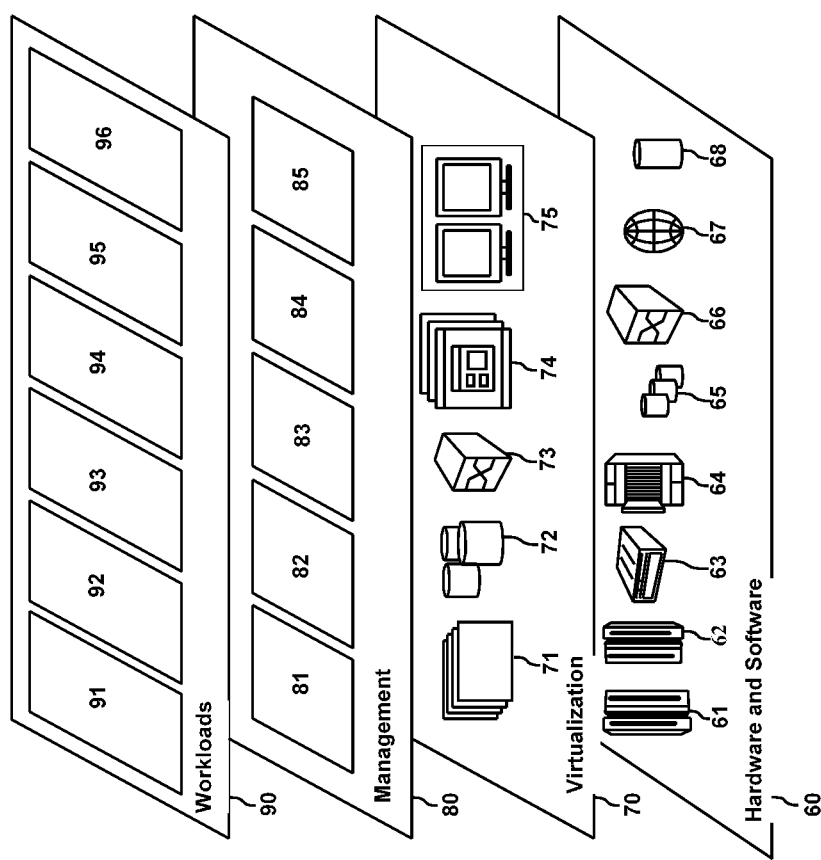
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user authentication processing 96. Hereinafter, reference will be made to FIG. 4 to FIG. 7 to describe details of the user authentication.

While the below description is written for mobile devices, it would be understood that the embodiments described below could be equally applied to other user devices such as fixed or stationary devices and terminals as well.

Biometric based authentication mechanisms such as fingerprint, iris, face and voice recognition have become significant features of a smart phone due to its attributes of lifetime, uniqueness and convenience. However, one of the problems with biometric based authentication methods is that it may be attacked by insider attackers, that is, someone who knows the user or is around the user, such as a friend or a family member of the user. An insider attacker has opportunities to have unauthorized access to the user's device due to the proximity between them. For example, to enable a fingerprint authentication mechanism, the user of a mobile phone may need to unlock the phone or access a specific APP on the phone with a password first, and then the user may add a fingerprint as an alternative authentication method by scanning a fingerprint with a fingerprint scanner on the phone. And next time when the user wants to open the phone or access the specific APP, the user just needs to perform simple fingerprint scanning to be able to perform the operation. However, the password may be easily guessed or snooped by an insider attacker. When the insider attacker gets an opportunity to take the mobile phone, the attacker may unlock the phone with the password and add the attacker's own fingerprints as an alternative authentication method. Thus, the attacker may find other opportunity to access the user's sensitive and private information on the mobile phone.

Although there have been some existing solutions which can prevent unauthorized access by identifying forged fingerprints, such solutions cannot work on the situation described above since from the view of the mobile phone, all of the fingerprints stored in the mobile phone are fingerprints authorized by the user and can be used to access the protected information accordingly.

Similar situations may happen with other biometric authentication methods, such as voice or visual authentication. Therefore, while the below description is written with reference to the fingerprint authentication, it would be understood that the embodiments described below could be equally applied to other biometrics authentication, such as iris, face, voice or visual authentication as well.

Considering the problems described above, according to embodiments of the present invention, a novel solution is proposed to provide user authentication by identifying primary biometric features from the biometric features stored in the mobile device and comparing a biometric feature input by the user with the primary biometric features. For example, the primary biometric feature may be a fingerprint, an iris, voice or face of the user. The primary biometric feature cannot be added, updated or removed by a user manually. Instead, the primary biometric feature may be identified by a machine learning algorithm based on the user's history activities associated with biometric features of the user. And with the primary biometric feature, the user is able to perform authority management for access-controlled operations. The access-controlled operations may include actions of opening a specific APP, making payment, making money transferring, or any action which needs additional authorization.

Figure 4:
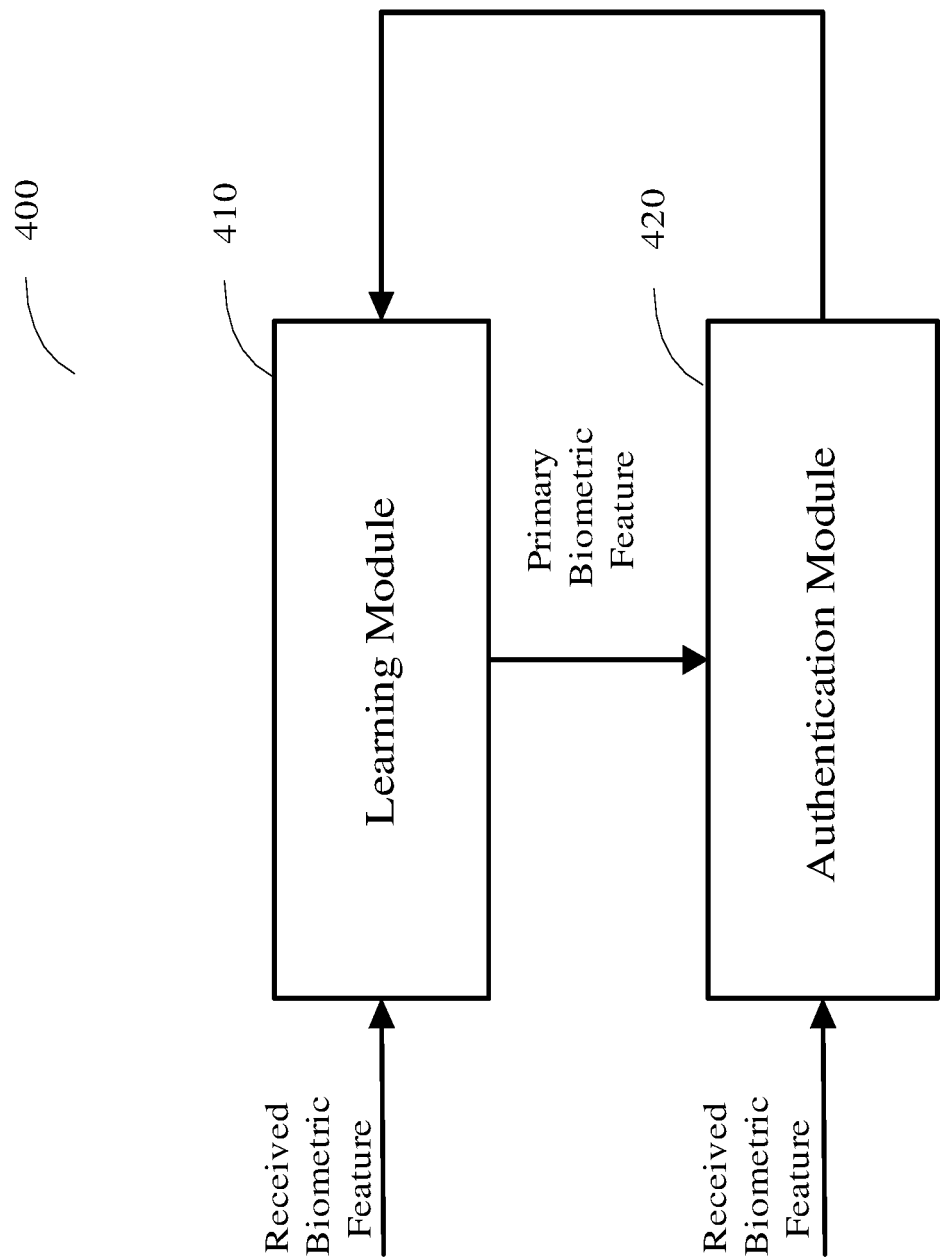
FIG. 4 depicts an example diagram of a system 400 for authenticating a user according to an embodiment of the present invention.

FIG. 4 depicts an example diagram of a system 400 for authenticating a user according to an embodiment of the present invention. The system may be implemented in a user device, such as a mobile device, including mobile phone, tablet, etc. The system 400 may include two modules: a learning module 410 and an authentication module 420. And the system 400 may work in two different phases: an initial phase and a deployment phase. During an initial phase, the learning module 410 may collect biometric features received from an input module of the user device (not shown) and activities associated with the received biometric features. The learning module 410 may identify one or more primary biometric features based on the collected information and provide its output to the authentication module 420. After the primary biometric features have been identified, the system 400 switches from the initial phase to the deployment phase. During the deployment phase, the authentication module 420 may compare the received biometric features with the primary biometric features, determine whether a biometric feature received from the user device matches with a primary biometric feature and then decide whether an access to an access-controlled operation would be allowed or not. The authentication module 420 may provide the authentication result to the learning module 410 as a feedback to further update the identification of the primary biometric feature. During the initial phase, before the primary biometric features being identified, the authentication module 420 may authorize the user for the access-controlled operations by comparing the received biometric feature with the biometric features which have been input by a user and stored in the user device.

Figure 5:
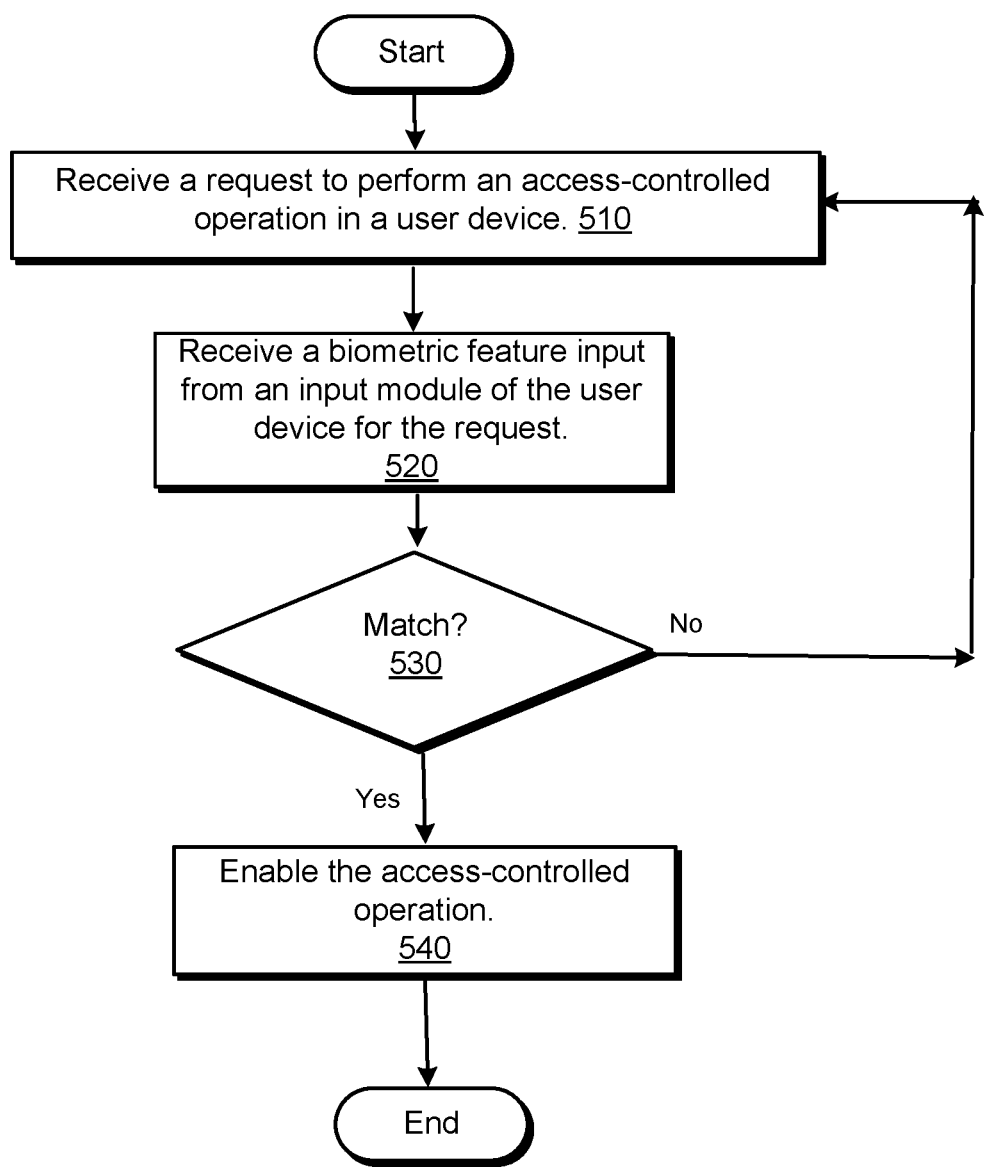
FIG. 5 depicts an example flowchart of a method for authenticating a user according to an embodiment of the present invention.

FIG. 5 depicts an example flowchart of a method for authenticating a user according to an embodiment of the present invention. At a block 510, a request is received to perform an access-controlled operation in a user device. At a block 520, a biometric feature input from an input module of the user device is received for the request. As mentioned above, the access-controlled operations may include actions of opening a specific APP, making payment, making money transferring, or any actions which need additional authorization. At a block 530, it is determined whether the received biometric feature matching with a primary biometric feature. The primary biometric feature is a biometric feature identified from a plurality of biometric feature stored in the user device, which may be used to authenticate a user for the access-controlled operation. At a block 540, in response to determining the received biometric feature matching with a primary biometric feature, the access-controlled operation is enabled.

According to an embodiment of the present invention, the biometric feature may be a fingerprint. According to a further embodiment of the present invention, the biometric feature may be at least one of the following: fingerprint, voice, iris, and face.

For sake of description, the following embodiments of the present invention are described by using fingerprint as an example of biometric feature. While the below description is written with reference to the fingerprint authentication, it would be understood that the embodiments described below could be equally applied to other biometrics authentication, such as iris, face, voice or visual authentication as well.

Figure 6:
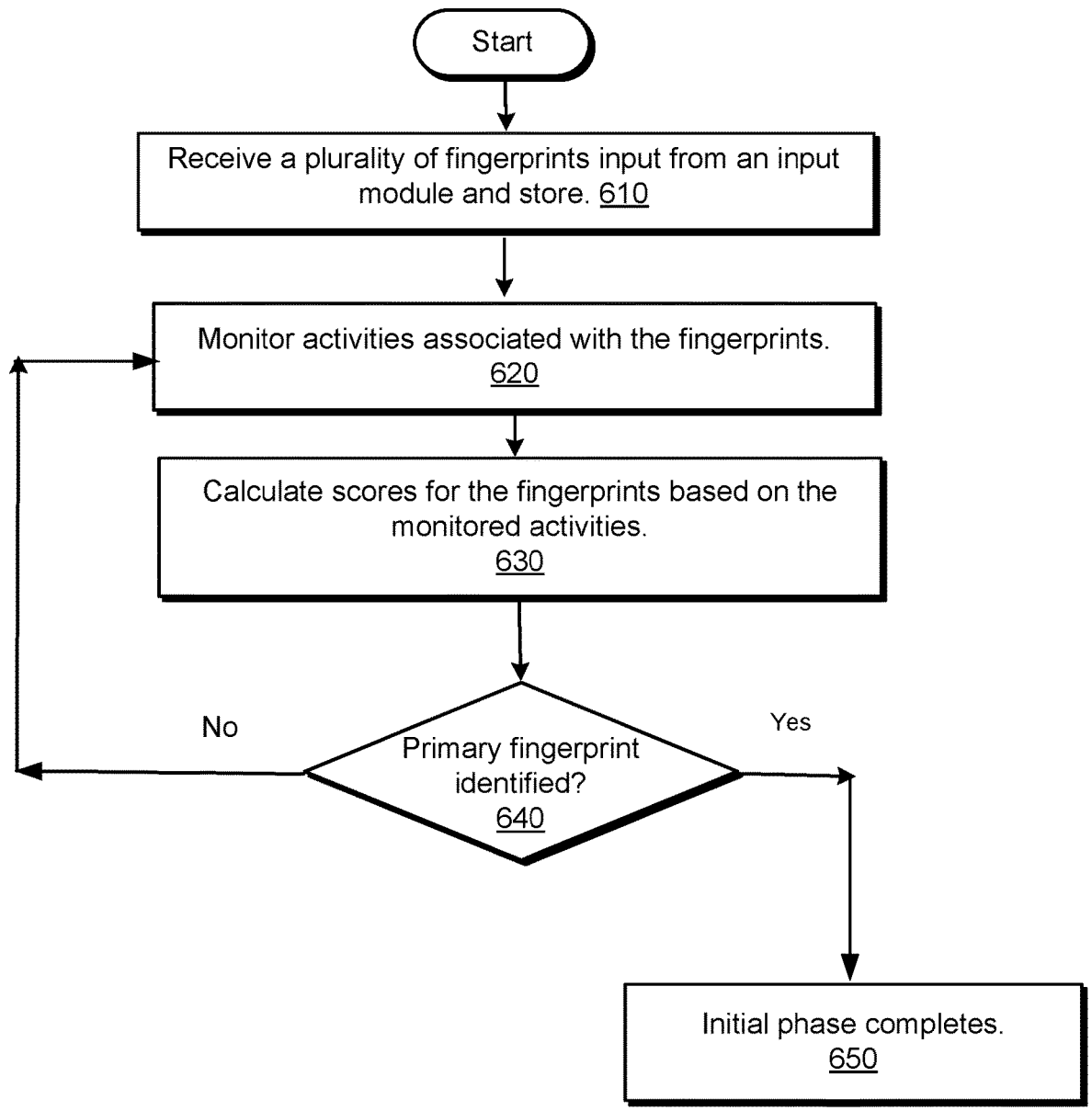
FIG. 6 depicts an example flowchart of an initial phase for identifying a primary fingerprint according to an embodiment of the present invention.

The primary biometric feature is identified based on history user activities by using a machine learning algorithm, for example, during an initial phase. FIG. 6 depicts an example flowchart of an initial phase for identifying a primary fingerprint according to an embodiment of the present invention.

During an initial phase, at a block 610, a plurality of fingerprints input from an input module of a user device are received and stored in the user device. The plurality of fingerprints may be input at the same time or may be input separately. For example, when the owner obtains the mobile phone, the owner may want to input one or more fingerprints into the mobile device to enable fingerprint authentication function. Later, the mobile phone may be obtained by someone else (an "attacker") who has known about the owner's power-on password, and the attacker may input his/her own fingerprints into the mobile phone as well. Under such situation, both the owner's fingerprints and the attacker's fingerprints would be stored in the user device for authentication. During this initial phase, each of the fingerprints stored in the user device may be equally used for user authentication.

At a block 620, activities associated with the fingerprints are monitored. According to embodiments of the present invention, various kinds of activities associated with the fingerprints may be monitored. For example, each time when a fingerprint is used to access the user device, various factors such as the timing of the access, duration of the access, operations undertaken, APPs accessed, etc. would be monitored and recorded for that specific fingerprint.

At a block 630, scores for the fingerprints are calculated based on the monitored activities. The monitored activities associated with the fingerprints may be used as inputs for a machine learning algorithm, and the machine learning algorithm may output a score for each fingerprint. The score may be calculated by the machine learning algorithm based on some typical behavior characteristics of a real owner of a user device. For example, some typical owner behaviors may include that, an owner may use the user device much more frequently than a potential attacker, an owner may bring the user device with him/her during commutes between office and home, an owner may access working email and calendar during working time, etc. According to an embodiment of the present invention, different weights may be assigned to different factors of the activities, and a consolidated score may be calculated based on those factors and their weights. The weights may be assigned by the machine learning algorithm automatically. Alternatively, the weights may be assigned by the owner of the user device, based on his/her own habits of using user devices.

At a block 640, it is determined whether one or more primary fingerprints have been identified. The primary fingerprints may be identified based on the scores of the fingerprints, that is, one or more fingerprints with higher scores may be determined to be primary fingerprints. In response to a determination at block 640 that the primary fingerprints have been satisfied, the process goes to block 650, where the initial phase completes. However, in response to a determination at block 640 that the primary fingerprints have not been identified, the process returns to block 620, continuing monitoring activities associated with the fingerprints.

Various criteria may be set by the machine learning algorithm to decide when the primary fingerprints may be identified and the initial phase may be stopped. According to an embodiment of the present invention, a fixed timing to stop the initial phase may be determined in advance. For example, a one-month period may be set in advance. And when the one-month period expires, a fingerprint with a highest score may be identified as a primary fingerprint. Alternatively, the timing may be decided based on the usage of fingerprints. For example, in most of the situation that a fingerprint of the owner of the mobile phone should be used far more frequently than a fingerprint of an attacker. Therefore, a score for the owner's fingerprint should be much higher than the score for the attacker's fingerprint. According to an embodiment of the present invention, a difference threshold may be defined for the scores of fingerprints. When the differences between the scores of one or more fingerprints and those of the rest of the fingerprints are higher than the threshold, the machine learning algorithm may identify those fingerprints with much higher scores as primary fingerprints. It should be understood that the timing and the threshold described above is intended to be illustrative only and embodiments of the present invention are not limited thereto. And it should be understood that various criteria may be used here to decide when the primary fingerprints may be identified and the initial phase may be stopped.

The primary fingerprints determined with above process cannot be added, updated or removed by a user manually. Instead, the primary fingerprints are constructed by the machine learning algorithm automatically, which ensures that the primary fingerprints are tamper-resistant. Also, the algorithm may decide when to stop the initial phase and switch to a deployment phase.

Figure 7:
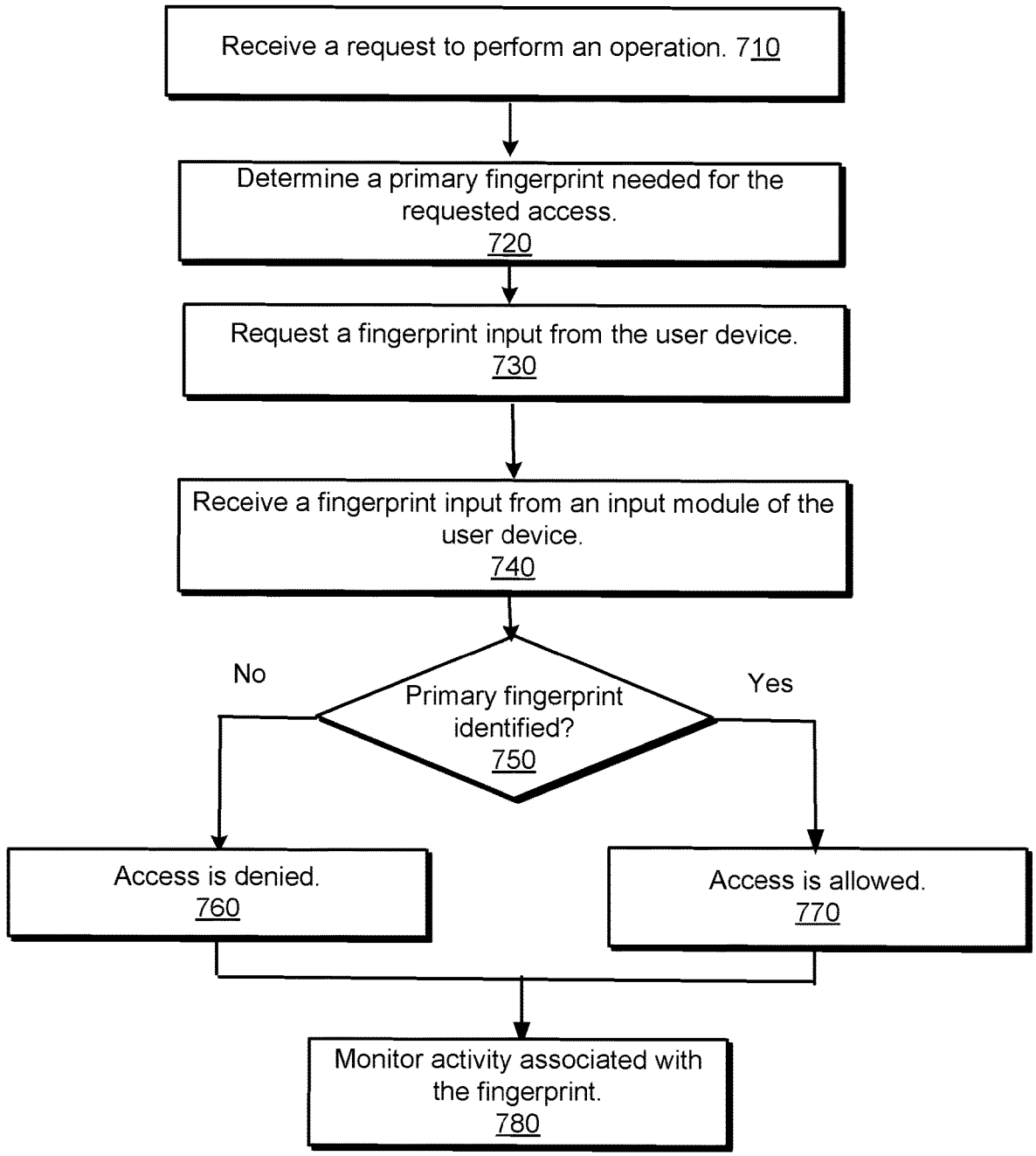
FIG. 7 depicts an example flowchart of a deployment phase for authenticating a user according to an embodiment of the present invention.

After the primary fingerprints are identified during the initial phase, the user device enters a deployment phase mode. FIG. 7 depicts an example flowchart of a deployment phase for authenticating a user according to an embodiment of the present invention.

At a block 710, a request is received to perform an operation in a user device. Upon receiving the request, at a block 720, it is determined that the requested operation is an access-controlled operation, and a primary fingerprint is needed for the access-controlled operation. According to an embodiment of the present invention, the user of the mobile device can designate access-controlled operations, such as the actions of opening a specific APP, making payment, making money transferring, etc. Alternatively, the access-controlled operations may be designated by mobile device automatically, depending on the security requirements of the operations. During the deployment phase, the user's access to the access-controlled operations need to be authorized by a primary fingerprint input by the user. For example, if the request is to access a specific access-controlled operation, it would be determined that a primary fingerprint is needed for the requested access. This may be accomplished by comparing the requested access with a table listing the access-controlled operations which need primary fingerprint for authentication.

At a block 730, in response to the operation being an access-controlled operation, a request may be provided to an interface of the user device, asking for fingerprint input. For example, when the device detects an access request to an access-controlled operation, a notice may be provided on the screen of the user device, prompting the user to scan his/her fingerprint. At a block 740, a fingerprint may be received from an input module, for example, a fingerprint scanner of the user device. And then, at a block 750, it is decided whether the received fingerprint matching with a primary fingerprint.

In response to a determination at block 750 that the received fingerprint matches with a primary fingerprint, the process goes to a block 770. At the block 770, the requested access is allowed. However, in response to a determination at block 750 that the received fingerprint does not match with a primary fingerprint, the process goes to a block 760, where the requested access is denied.

During the deployment phase, the machine learning algorithm may continue collecting the fingerprint information and associate it with a successful or a failed action of accessing the access-controlled operation and the following activities as well. The process may go to a block 780, after the access is allowed at the block 770 or the access is denied at the block 760. At the block 780, the activity associated with the received biometric feature is monitored. With the monitored activity, the score of the fingerprint may be increased or decreased accordingly. The scores of the fingerprints may be used to update the one or more primary biometric features.

As described above, according to an embodiment of the present invention, more than one fingerprints may be identified as primary fingerprints. And one or more primary fingerprints may be designated for an access-controlled operation. The primary fingerprints may be divided into different categories for different access controls. For example, if there are three fingerprints identified as primary fingerprints, the three fingerprints may be divided into level 1, level 2 and level 3 according to their scores respectively. And the access-controlled operations may also be divided into several groups according to the respective security requirements. There may be a mapping between the levels and the groups of access-controlled operations. For example, all of the payment related operations may need a level-3 (the highest level) primary fingerprint, the access to the photos may need a level-2 primary fingerprint, and unlocking screen may only need a level-1 primary fingerprint.

It should be noted that the user authentication method or system according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving during an initial phase, by one or more processing units, a plurality of biometric feature inputs from an input module of the user device wherein each of the biometric feature inputs is stored in the user device, and is used equally to authenticate one or more activities;
   assigning a weight to each of the one or more activities, and calculating a score for each of the biometric feature inputs based on a weighted frequency of an association of each of the biometric feature inputs with a specific activity from among the one or more activities;

determining a primary biometric feature input from among the biometric feature inputs for the specific activity based on the primary biometric feature input having a higher score among the biometric feature inputs; and based on the determination of the primary biometric feature input, beginning a deployment phase, wherein access controlled operations require the primary biometric feature input for authentication.

2. The method of claim 1, further comprising:

receiving, by one or more processing units, a plurality of biometric features input from the input module of the user device;

monitoring, by one or more processing units, activities associated with the plurality of biometric features; and identifying, by one or more processing units, one or more primary biometric features based on the monitored activities associated with the plurality of biometric features.

3. The method of claim 1, further comprising:

denying, by one or more processing units, the access-controlled operation in response to determining the received biometric feature not matching with the primary biometric feature.

4. The method of claim 1, further comprising:

in response to the access-controlled operation being enabled, monitoring, by one or more processing units, activity associated with the received biometric feature.

5. The method of claim 4, further comprising:

updating, by one or more processing units, one or more primary biometric features based on the monitored activity associated with the received biometric feature.

6. A computer-implemented system, comprising:

one or more processors;

a memory coupled to at least one of the processors; and a set of computer program instructions stored in the memory and executed by at least one of the processors in order to perform actions of:

receiving during an initial phase a plurality of biometric feature inputs from an input module of the user device wherein each of the biometric feature inputs is stored in the user device, and is used equally to authenticate one or more activities;

assigning a weight to each of the one or more activities, and calculating a score for each of the biometric feature inputs based on a weighted frequency of an association of each of the biometric feature inputs with a specific activity from among the one or more activities;

determining a primary biometric feature input from among the biometric feature inputs for the specific activity based on the primary biometric feature input having a higher score among the biometric feature inputs; and based on the determination of the primary biometric feature input, beginning a deployment phase, wherein access controlled operations require the primary biometric feature input for authentication.

7. The system of claim 6, further comprising a set of computer program instructions stored in the memory and executed by at least one of the processors in order to perform actions of:

receiving a plurality of biometric features input from the input module of the user device;

monitoring activities associated with the plurality of biometric features; and identifying one or more primary biometric features based on the monitored activities associated with the plurality of biometric features.

8. The system of claim 6, further comprising a set of computer program instructions stored in the memory and executed by at least one of the processors in order to perform actions of:

denying the access-controlled operation in response to determining the received biometric feature not matching with the primary biometric feature.

9. The system of claim 6, further comprising a set of computer program instructions stored in the memory and executed by at least one of the processors in order to perform actions of:

in response to the access-controlled operation being enabled, monitoring activity associated with the received biometric feature.

10. The system of claim 9, further comprising a set of computer program instructions stored in the memory and executed by at least one of the processors in order to perform actions of:

updating one or more primary biometric features based on the monitored activity associated with the received biometric feature.

11. A computer program product comprising a computer readable storage medium having program instructions embodied therewith, wherein the computer readable storage medium is not a transitory signal per se, the program instructions readable by a device to cause the device to perform a method comprising:

receiving during an initial phase, by one or more processing units, a plurality of biometric feature inputs from an input module of the user device wherein each of the biometric feature inputs is stored in the user device, and is used equally to authenticate one or more activities;

assigning a weight to each of the one or more activities, and calculating a score for each of the biometric feature inputs based on a weighted frequency of an association of each of the biometric feature inputs with a specific activity from among the one or more activities;

determining a primary biometric feature input from among the biometric feature inputs for the specific activity based on the primary biometric feature input having a higher score among the biometric feature inputs; and based on the determination of the primary biometric feature input, beginning a deployment phase, wherein access controlled operations require the primary biometric feature input for authentication.

12. The computer program product of claim 11, the method further comprising:

receiving a plurality of biometric features input from the input module of the user device;

monitoring activities associated with the plurality of biometric features; and identifying one or more primary biometric features based on the monitored activities associated with the plurality of biometric features.

13. The computer program product of claim 11, the method further comprising:

denying the access-controlled operation in response to determining the received biometric feature not matching with the primary biometric feature.

14. The computer program product of claim 11, the method further comprising:

in response to the access-controlled operation being enabled, monitoring activity associated with the received biometric feature.

15. The computer program product of claim 14, the method further comprising:
updating one or more primary biometric features based on the monitored activity associated with the received biometric feature.

16. The computer program product of claim 11, wherein one or more primary biometric features are designated for an access-controlled operation.

17. The method of claim 1, wherein the primary biometric feature cannot be added, removed or modified manually.

18. The computer program product of claim 11, wherein the primary biometric feature cannot be added, removed or modified manually.

19. The method of claim 1, wherein a transition from the initial phase to the deployment phase is based on a duration of time, wherein the biometric feature input having a highest score is identified as the primary biometric feature input.

20. The method of claim 1, wherein a transition from the initial phase to the deployment phase is based on the biometric feature input exceeding a configured threshold score.

* * * * *